United States Patent
Mead

(10) Patent No.: US 7,531,055 B2
(45) Date of Patent: May 12, 2009

(54) PRINTED BORDER

(75) Inventor: Bruce Mead, Mississauga (CA)

(73) Assignee: Kingspan Holdings (IRL) Ltd., Cavan (IE)

( * ) Notice: Subject to any disclaimer, the term of this patent is extended or adjusted under 35 U.S.C. 154(b) by 0 days.

(21) Appl. No.: 11/436,984

(22) Filed: May 19, 2006

(65) Prior Publication Data

US 2007/0095452 A1 May 3, 2007

Related U.S. Application Data

(63) Continuation of application No. 10/211,643, filed on Aug. 5, 2002, now abandoned.

(51) Int. Cl.
*E04F 15/00* (2006.01)
*B32B 38/04* (2006.01)
*B32B 38/14* (2006.01)

(52) U.S. Cl. .................. 156/71; 156/254; 156/256; 156/277

(58) Field of Classification Search .......... 156/71, 156/250, 254, 256, 277; 428/81, 85, 542.2, 428/542.6; 52/220.1, 220.2, 220.3, 746.1, 52/747.11
See application file for complete search history.

(56) References Cited

U.S. PATENT DOCUMENTS

| | | | | | |
|---|---|---|---|---|---|
| 3,696,578 | A | * | 10/1972 | Swensen et al. | 52/789.1 |
| 4,312,686 | A | * | 1/1982 | Smith et al. | 156/209 |
| 4,625,491 | A | * | 12/1986 | Gibson | 52/791.1 |
| 5,501,902 | A | * | 3/1996 | Kronzer | 428/32.11 |
| 5,744,220 | A | * | 4/1998 | Ringo | 428/195.1 |
| 6,803,110 | B2 | * | 10/2004 | Drees et al. | 428/423.7 |

FOREIGN PATENT DOCUMENTS

| | | | |
|---|---|---|---|
| JP | 04062055 A | * | 2/1992 |
| WO | WO 0105296 A1 | * | 1/2001 |

OTHER PUBLICATIONS

English Abstract of JP 04-62055.*

* cited by examiner

*Primary Examiner*—Philip C Tucker
*Assistant Examiner*—Sing P Chan
(74) *Attorney, Agent, or Firm*—Jacobson Holman PLLC

(57) ABSTRACT

A method of producing a floor panel for an elevated floor including the steps of printing a border along the edge of the floor panel and then applying a protective wear surface over the printed surface.

14 Claims, 2 Drawing Sheets

PRINTED BORDER

RELATED APPLICATION

This application is a continuation of application Ser. No. 10/211,643, now abandoned.

FIELD OF INVENTION

This invention relates generally to a method of producing a floor panel for an elevated floor, including printing a border along the edge thereof, and includes the floor panel with the printed edge.

BACKGROUND ART

Elevated floors have been gaining widespread usage and prominence in view of the wide proliferation of computers installed and used in buildings. These elevated floors are sometimes called "computer floors". Generally speaking such elevated floors are designed to be supported on pedestals at the corners of the elevated floor so as to present an access space between the elevated floor and the floor structure that can be used to run electrical cabling, computer lines, air conditioning or other heating systems.

These computer floors comprise floor panels and are often provided with some form of floor covering laminated to the upper surface thereof to provide a finished, exposed floor surface. These floor coverings may be carpeted, include vinyl asbestos tile (VAT) or high-pressure laminate usually referred to as HPL. When the floor covering is laminated to the upper surface of the floor panel an attractive floor appearance is provided with the plurality of abutting floor panels defining the floor where individual panels can be removed.

Existing technology shows floor panels having a black border or coloured border disposed around the perimeter of the access floor panel so as to generally:

(a) offer an attractive appearance
(b) mask any gaps or joints
(c) prevent chipping or exposure of the chipping of the edges.

Floor panels have heretofore been designed that include applying plastic shapes around the perimeter of the trim as disclosed in U.S. Pat. No. 4,447,998. These trims tend to become loose and fall off and become a maintenance problem.

Other prior art devices comprise routing and exposing an inner core of black paper to construct a trimmed appearance. Generally the trim is disposed lower than the surface of the decorative laminate an example of which is shown in U.S. Pat. No. 4,625,491. Disadvantages experienced from such routed edges stem from the paper core left exposed and unprotected against cleaners and moisture, and the recessed groove acts as a dirt and moisture trap.

Other prior art methods comprise burning the top clear melamine surface and applying a ultra violet cured paint to simulate a black border or trim. However, it is generally difficult to control the burning process accurately and accordingly such process sometimes burn through the decorative layer and sometimes does not totally remove the clear protective layer resulting in the applied paint wearing off. Other prior art methods include laminating the patterned wear surface to a substrate of black or coloured plastic to make a layered system where the substrate becomes the border or trim.

Furthermore patterned tiles have also heretofore been known as disclosed in U.S. Pat. Nos. 5,670,288 and 6,413,618.

It is an object of this invention to provide an improved floor tile having a patterned edge and an improved method of producing same.

DISCLOSURE OF INVENTION

It is an aspect of this invention to provide a method of producing a floor panel for an elevated floor comprising the steps of printing a border along the edge of said floor panel then applying a protective wear surface over said printed surface.

It is a further aspect of this invention to provide a method of producing a floor panel for an elevated floor comprising the steps of printing a plurality of grid lines on a substrate, cutting said substrate along said grid lines so as to present a floor covering having an edge defined by said cut grid lines, applying said cut substrate to a load surface of said floor panel.

It is yet another aspect of this invention to provide a method of producing a floor covering for an elevated floor comprising the steps of printing a decorative pattern including a plurality of rectangular grid lines on one surface of a paper substrate, combining said paper substrate with a plurality of sheets to produce a floor covering, applying a wear surface on said decorative surface, cutting said floor covering along said grid lines so as to present a plurality of floor covering panels having an edge defined by said cut grid lines, applying an adhesive to a load surface of said elevated floor so as to bond one of said floor cover panels to said load surface.

It is a further aspect of this invention to provide a floor panel for an elevated floor comprising a base adapted to be supported and providing a load bearing surface, a floor covering co-extensive with and adhering to said load surface of said base, a printed edge presented by said floor covering, a protective coat over said floor cover and printed edge.

BEST MODE FOR CARRYING OUT THE INVENTION

Figure 1:
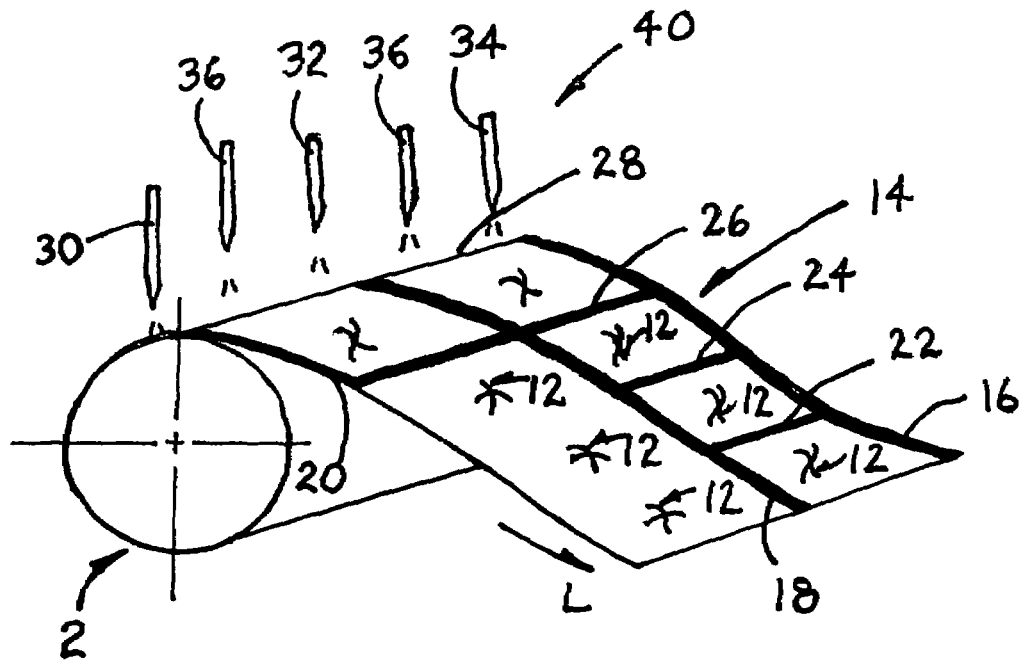
FIG. 1 is a representative perspective view of the printing process.

In the description that follows, like parts are marked throughout the specification and the drawings with the same respective reference numerals. The drawings are not necessarily to scale and in some instances proportions may have been exaggerated in order to more clearly depict certain features of the invention.

FIG. 1 is a perspective representative view of the invention to be described herein. In particular a roll 2 of substrate 4 is unwound and subjected to a printing process to be described herein. The substrate may be any variety of materials to be used as a floor covering such as paper, plastic or the like. In particular a floor covering 10 is produced by printing a decorative pattern 12, which includes a plurality of grid lines 14. More specifically the pattern of grid lines comprises a rectangular or square pattern including longitudinal lines 16, 18 and 20 and transverse lines 22, 24, 26 and 28. Such decorative patterns 12 and grid lines 14 can be applied by a variety of printing means including computer laser printing or silk screening. Other methods can include roto gravure or other printing means well known to those persons skilled in the art.

For example the grid lines 16 can be produced by the spray head 30 while the grid lines 18 and 20 produced by the spray head 32 and 34 respectively. The spray head 30, 32 and 34 may be stationary. On the other hand the transverse grid lines 26 and 28 may be produced by moving spray means 36 which move in a direction transverse to the direction L which is the direction of unravelling of the substrate 4. Other printing methods and arrangements can be utilized all in a manner well known to those persons skilled in the art. As the printed decorative substrate 4 leaves the printing station 40, a plurality of cutting means 42 may be utilized to cut along said grid lines as shall be described herein.

It will be noticed that the grid lines 16 and 20 presented along the edges of the substrate 4 are approximately half of the size of the grid line 18 which is disposed within the interior of the printed web of substrate 4 so that once the floor covering 10 is cut by cutting means 42 the relative dimension of the perimetral border will be approximately the same throughout.

Figure 2:
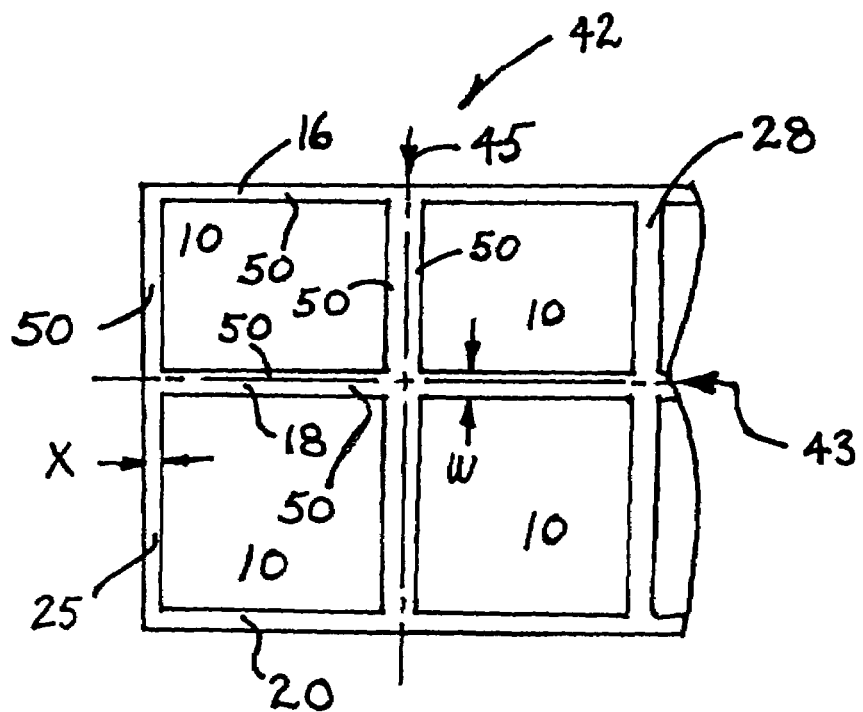
FIG. 2 is a top plan view of the printed decorative surface.
Figure 3:
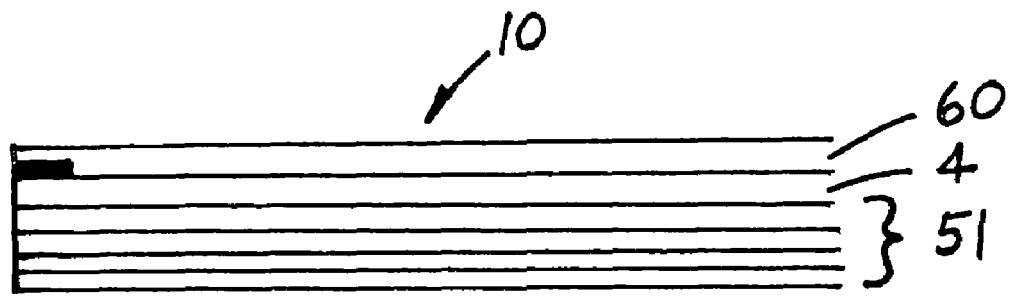
FIG. 3 is a side elevational magnified view of the floor covering.

The substrate 4 is cut by cutting means 42 along the grid lines so as present a floor covering 10 having an edge 50 defined by the grid lines. For example, by looking at FIG. 2 the floor covering 10 has an edge 50 defined by grid line 25 cut grid line 18, cut grid line 26 and grid line 16. The relative width W of grid line 18 is approximately twice the width of grid line 25 X so that once the substrate 4 is cut by cutting means 42 the border 50 along the perimetral edge will be approximately the same thickness. Any variety of cutting means 42 can be utilized. In particular the cutting means 42 can comprise knives or cutting wheels 43 and 45. In one arrangement the cutting wheel 43 can be stationary while the cutting wheel 45 may move by a variety of means well known to those persons skilled in the art in a direction transverse to the unwinding of the roll 2.

Accordingly the method described herein generally comprises a method of producing a floor panel for an elevate floor which comprises the steps of printing a border along the edge of the floor panel.

The printed substrate 4 is mounted on a stack of sheets 51, which in one embodiment comprises a stack of Kraft paper and then consolidated under heat and pressure. In one embodiment the consolidation comprises stacking the black or coloured border 50 on substrate 4 on top of a stack of Kraft paper 51 with a clear protective surface sheet 60 and pressed to make a standard high-pressure laminate (HPL) sheet of a thickness required or specified for a floor covering 10 application.

The floor tiles 10 may be printed and pressed in a 24 inch by 24 inch, 24⅛ by 24⅛ or 49×97 inch sheets then cut to base panel 70 and then cut to panel size prior to lamination to the floor panel itself. The HPL floor surface 10 may be cut oversize to approximately 24, and a black border applied by silk screening process with the clear protective layer 60 applied with heat and pressure. The oversized floor surface 10 with the black border 50 could then be sized prior to adhesion to the load surface 80 of a base 70 by means of an appropriate adhesive 82.

The printing or marking means may be applied at the time of printing a decorative surface 12 to the web 4 or may be applied at a later stage. Furthermore it is possible that no decorative surface 12 is applied but rather the grid pattern 14 applied thereon.

The colour chosen for the grid pattern 14 is generally a dark colour such as black, brown or the like, but could be any colour.

The invention described herein provides a black or coloured border or trim that is permanently printed to the laminate itself. The trim or border 50 will generally not wear off, dislodge or become loose. The border 50 requires no removal of material and is protected by the same high wear finish 60 as the rest of the floor covering 10. The trim or border 50 is flush with and has generally no upward or downward step in the surface of the floor covering.

The invention described herein utilizes high-pressure plastic laminate having a black or coloured border 50 printed into the pattern decorative laminate to produce the appearance of a border or trim 50 around the perimeter of the floor covering 10. The method described herein eliminates the need to route and expose an inner core. Furthermore the method eliminates the need to laser etch the surface and apply a printed trim which may wear off. Furthermore the invention described herein eliminates the need to have an extra lamination and a joint between the trim and the laminate.

The invention as described herein may in one embodiment comprise a layer of melamine or other clear protective product applied over the decorative layer of the printed paper. The decorative layer of printed paper has a black border printed approximately 24 inches by 24 inches by ⅛ inch wide grid to produce a black border around the tile. The black border may be applied to the decorative paper.

In another embodiment the black grid lines may be printed or marked in a 24 inch by 24 inch by 3/16 inch wide pattern. Furthermore such grid lines may be printed on a portion of a surface of a substrate 4 as shown for example by the region marked 13 in FIG. 1 which may be used for standard metric 600 mm by 600 mm laminate. Furthermore the border 50 may be any colour.

The thickness of the high-pressure laminate sheet may vary and in some embodiments can range from 1/16 inch to ¼ inch depending on the intended use. However, the invention is not limited to such thickness and may be outside of the range described above. Furthermore the wear resistant overlay 60 may comprise Mylar or other material. In one embodiment the printed substrate 4 may be cut to approximately 49 inches by 97 inches and then pressed as described and thereafter rough cut to approximately 24⅛ inch panels.

The rough cut floor cover panels may then be disposed into a sizing machine such as a router or the like that adjusts to provide a 24 inch by 24 inch or 600 mm by 600 mm panel with a black grid line of approximately 0.100 inch located equally as a border 50 around the panel.

Figure 4:
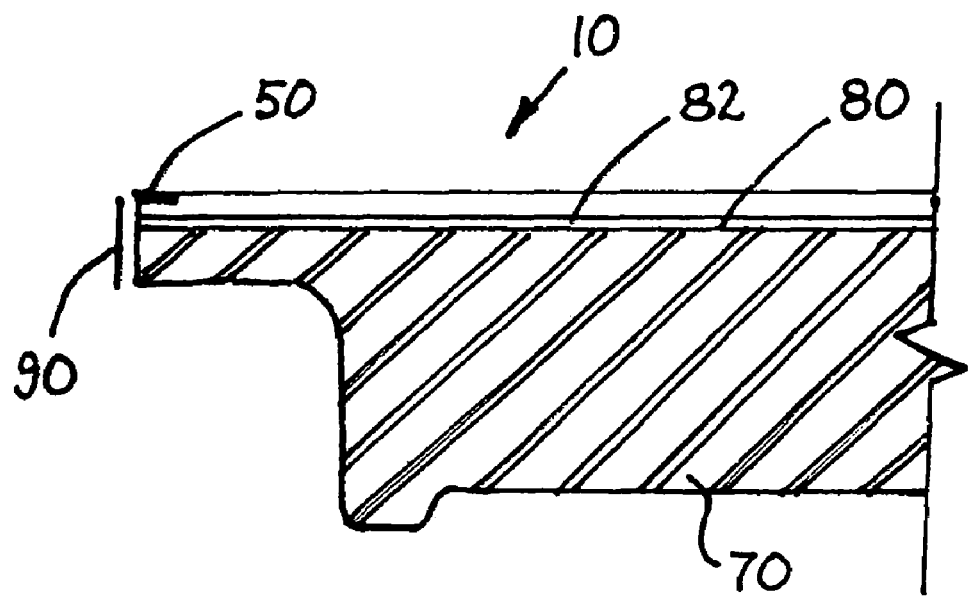
FIG. 4 is a side view of the floor covering adhered to the load surface of the base.

Thereafter the HPL panel is then laminated to the access floor panel 70. The edges of the panel may be marked with black ink 90 as shown in FIG. 4 with black ink, paint, marker or the like.

The sizing machine (not shown) may consist of two cutters on tracks (not shown) spaced to the size of the tile. The tile must generally be located dead center using a laser beam or mechanical device to find the center of the grid or panel 10. The panel 10 is then clamped down by a variety of means including a vacuum table. The cutters may then travel past the tile cutting to size. The table then may rotate 90° and the cutters travel past cutting the other two sides. The part may then be taken off and finished to size.

According the invention described herein comprises a method of producing a floor covering for an elevated floor comprising the steps of:

(a) printing a decorative pattern including a plurality of rectangular grid lines 14 on one surface of a paper substrate 4;

(b) laminating or combining the paper substrate 4 with a plurality of Kraft sheets 51;

(c) applying a wear surface 60 on the decorative surface;

(d) cutting the floor panel along the grid lines 14 to present a plurality of floor covering panels having an edge 50 defined by the grid lines 14;

(e) applying an adhesive 82 to the load surface 80 of the elevated floor base 70 so as bond one of the floor cover panels 10 the load surface 80.

Various embodiments of the invention have now been described in detail. Since changes in and/or additions to the above-described best mode may be made without departing from the nature, spirit or scope of the invention, the invention is not to be limited to said details.

I claim:

1. A method of producing a floor panel for an elevated floor, the method comprising the steps of:
   (a) printing a plurality of grid lines in a rectangular pattern on a substrate surface, some of said grid lines being located along edges of the substrate surface and some of the grid lines being located at an interior of the substrate surface forming interior grid lines;
   (b) cutting the substrate surface along and through only at least some of the interior grid lines so that the grid lines form a border of a panel, the interior grid lines having a thickness approximately double that of the edge lines so that, after cutting, each panel has the border of a uniform thickness;
   (c) applying a protective wear overlay over said substrate surface and over the printed grid lines, said border being protected by the protective wear overlay and being flush with a printed portion and a non-printed portion of the substrate surface;
   said steps (b) and (c) being performed in either order.

2. The method as claimed in claim 1, wherein said printing step includes printing said grid lines in a pattern.

3. The method as claimed in claim 1, wherein said printing step includes computer laser printing.

4. The method as claimed in claim 1, wherein said printing step includes silk screening process.

5. The method as claimed in claim 1, wherein said printing step includes printing said grid lines in a dark color.

6. The method as claimed in claim 1, wherein said protective wear overlay is a melamine material.

7. The method as claimed in claim 1, wherein the substrate surface is paper.

8. The method as claimed in claim 7, further comprising a step of pressing the paper onto lower layers in a high pressure lamination operation.

9. The method as claimed in claim 8, wherein the protective wear overlay is applied as a clear protective sheet and is pressed in the lamination operation.

10. The method as claimed in claim 1, wherein the substrate surface is a web.

11. The method as claimed in claim 10, wherein the substrate surface is cut in a sizing machine after being cut along the grid lines.

12. The method as claimed in claim 1, further comprising the steps of:
    producing a plurality of the panels; and
    applying the panels to a load bearing surface of an elevated floor.

13. The method as claimed in claim 12, further comprising the step of applying an adhesive to said load bearing surface.

14. The method as claimed in claim 12, wherein at least some of said panels are cut along edges prior to being applied to said load bearing surface.

* * * * *